(12) United States Patent
Kim et al.

(10) Patent No.: US 11,352,492 B2
(45) Date of Patent: Jun. 7, 2022

(54) THERMOPLASTIC POLYCARBONATE RESIN COMPOSITION AND MOLDED PRODUCT FORMED THEREFROM

(71) Applicant: LOTTE CHEMICAL CORPORATION, Seoul (KR)

(72) Inventors: Su Ji Kim, Uiwang-si (KR); Pil Ho Kim, Uiwang-si (KR); Seung Shik Shin, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 10 days.

(21) Appl. No.: 16/767,354

(22) PCT Filed: Dec. 28, 2018

(86) PCT No.: PCT/KR2018/016838
§ 371 (c)(1),
(2) Date: May 27, 2020

(87) PCT Pub. No.: WO2019/132574
PCT Pub. Date: Jul. 4, 2019

(65) Prior Publication Data
US 2020/0385572 A1 Dec. 10, 2020

(30) Foreign Application Priority Data
Dec. 28, 2017 (KR) .................. 10-2017-0182616

(51) Int. Cl.
*C08L 69/00* (2006.01)
*C08K 5/42* (2006.01)
*C08L 25/14* (2006.01)

(52) U.S. Cl.
CPC ............... *C08L 69/00* (2013.01); *C08K 5/42* (2013.01); *C08L 25/14* (2013.01); *C08L 2205/03* (2013.01)

(58) Field of Classification Search
None
See application file for complete search history.

(56) References Cited

U.S. PATENT DOCUMENTS

| 2010/0113660 | A1* | 5/2010 | Tomoda | C08L 69/00 524/165 |
| 2011/0065848 | A1 | 3/2011 | Jung et al. | |
| 2011/0077332 | A1* | 3/2011 | Tomoda | C08L 69/00 524/165 |
| 2011/0207846 | A1 | 8/2011 | Monden | |
| 2014/0243467 | A1* | 8/2014 | Dern | C08K 7/14 524/508 |
| 2014/0295363 | A1 | 10/2014 | Sun et al. | |
| 2018/0319979 | A1 | 11/2018 | Kim et al. | |
| 2020/0270451 | A1* | 8/2020 | Eckel | C08L 69/00 |

FOREIGN PATENT DOCUMENTS

| CN | 105907074 | * | 8/2016 |
| JP | 2011127002 | * | 6/2011 |
| JP | 2016104835 | * | 6/2016 |
| KR | 10-2001-0082298 A | | 8/2001 |
| KR | 10-2009-0118739 A | | 11/2009 |
| KR | 10-2012-0002991 A | | 1/2012 |
| KR | 10-2014-0095465 A | | 8/2014 |
| KR | 10-2016-0057606 A | | 5/2016 |
| KR | 10-2017-0079625 A | | 7/2017 |
| WO | 2019/132574 A1 | | 7/2019 |

OTHER PUBLICATIONS

Comprehensive Catalogue Oleo & Specialty Chemicals NOF; Mar. 2017 pp. 1-63. (Year: 2017).*
Legrand; Handbook of Polycarbonate Science and Technology; (2000) pp. 180-182. (Year: 2000).*
International Search Report in counterpart International Application No. PCT/KR2018/016838 dated Apr. 5, 2019, pp. 1-4.

* cited by examiner

*Primary Examiner* — David J Buttner
(74) *Attorney, Agent, or Firm* — Additon, Pendleton & Witherspoon, P.A.

(57) ABSTRACT

A thermoplastic resin composition of the present invention comprises: approximately 100 parts by weight of a polycarbonate resin; approximately 0.01-2 parts by weight of a modified aromatic vinyl-based copolymer resin; approximately 0.01-1 parts by weight of a metal aliphatic sulfonate; and approximately 0.01-2 parts by weight of a fluorinated olefin-based resin, wherein the modified aromatic vinyl-based copolymer resin is a polymer of a monomer mixture comprising an aromatic vinyl-based monomer and glycidyl (meth)acrylate. The thermoplastic resin composition has excellent flame retardancy, transparency and the like.

8 Claims, No Drawings

THERMOPLASTIC POLYCARBONATE RESIN COMPOSITION AND MOLDED PRODUCT FORMED THEREFROM

CROSS-REFERENCE TO RELATED APPLICATIONS

This application claims priority to and the benefit of International Application No. PCT/KR2018/016838, filed Dec. 28, 2018, which published as WO 2019/132574 on Jul. 4, 2019, and Korean Patent Application No. 10-2017-0182616, filed in the Korean Intellectual Property Office on Dec. 28, 2017, the entire disclosure of each of which is incorporated herein by reference.

TECHNICAL FIELD

The present invention relates to a thermoplastic resin composition and a molded product formed of the same. More specifically, the present invention relates to a thermoplastic resin composition which has good properties in terms of flame retardancy and transparency, and a molded product formed of the same.

BACKGROUND ART

Polycarbonate resins have good properties in terms of mechanical strength, thermal resistance, transparency, and the like, and thus are widely used in various fields, for example, office automation devices, electric/electronic products, construction materials, and the like. Particularly, in order to be applied to a transparent exterior material for electric/electronic products, the polycarbonate resins are required to have high flame retardancy, high transparency, and good mechanical properties. Particularly, light-diffusion polycarbonate materials used for lighting are required to have both high transmittance and high flame retardancy.

In order for a thermoplastic resin composition including a polycarbonate resin to realize good properties in terms of flame retardancy, rigidity, and the like, additives, such as an anti-dripping agent and fillers, are added to the resin composition in addition to the polycarbonate resin. However, use of the anti-dripping agent and the fillers in excess amounts can cause deterioration in transparency and processability of the thermoplastic resin composition.

Therefore, there is a need for a thermoplastic resin composition which has good properties in terms of flame retardancy, transparency, and balance therebetween.

The background technique of the present invention is disclosed in Korean Patent Publication No. 10-2014-0095465 and the like.

DISCLOSURE

Technical Problem

It is one aspect of the present invention to provide a thermoplastic resin composition which has good properties in terms of flame retardancy, transparency, and the like.

It is another aspect of the present invention to provide a molded product formed of the thermoplastic resin composition set forth above.

The above and other aspects of the present invention will become apparent from the detailed description of the following embodiments.

Technical Solution

1. One aspect of the present invention relates to a thermoplastic resin composition. The thermoplastic resin composition includes: about 100 parts by weight of a polycarbonate resin; about 0.01 parts by weight to about 2 parts by weight of a modified aromatic vinyl copolymer resin; about 0.01 parts by weight to about 1 part by weight of a metal aliphatic sulfonate; and about 0.01 parts by weight to about 2 parts by weight of a fluorinated olefin resin, wherein the modified aromatic vinyl copolymer resin is a polymer of a monomer mixture including an aromatic vinyl monomer and glycidyl (meth)acrylate.

2. In Embodiment 1, the polycarbonate resin may have a weight average molecular weight (Mw) of about 10,000 g/mol to about 200,000 g/mol.

3. In Embodiments 1 or 2, the polycarbonate resin may be a branched polycarbonate resin.

4. In Embodiments 1 to 3, the modified aromatic vinyl copolymer resin may be a polymer of the monomer mixture including about 60 wt % to about 90 wt % of the aromatic vinyl monomer and about 10 wt % to about 40 wt % of the glycidyl (meth)acrylate.

5. In Embodiments 1 to 4, the modified aromatic vinyl copolymer resin may have a weight average molecular weight (Mw) of about 20,000 g/mol to about 40,000 g/mol.

6. In Embodiments 1 to 5, the metal aliphatic sulfonate may be represented by Formula 1:

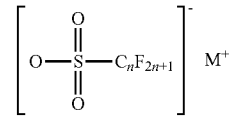

[Formula 1]

where M is lithium (Li), sodium (Na), or potassium (K), and n is an integer of 1 to 10.

7. In Embodiments 1 to 6, the modified aromatic vinyl copolymer resin and the metal aliphatic sulfonate may be present in a weight ratio of about 1:1 to about 3:1.

8. In Embodiments 1 to 7, the metal aliphatic sulfonate and the fluorinated olefin resin may be present in a weight ratio of about 1:2 to about 1:4.

9. In Embodiments 1 to 8, the thermoplastic resin composition may have a flame retardancy of V-0 or higher, as measured on a 1.0 mm thick specimen in accordance with a UL-94 vertical burning test.

10. In Embodiments 1 to 9, the thermoplastic resin composition may have a transmittance of about 80% or more, as measured on a 1.0 mm thick specimen in accordance with ASTM D1003.

11. Another aspect of the present invention is a molded product formed of the thermoplastic resin composition according to any one of Embodiments 1 to 10.

Advantageous Effects

The present invention provides a thermoplastic resin composition which has good properties in terms of flame retardancy, transparency, and the like, and a molded product formed of the same.

BEST MODE

Hereinafter, embodiments of the present invention will be described in detail.

A thermoplastic resin composition according to the present invention includes: (A) a polycarbonate resin; (B) a modified aromatic vinyl copolymer resin; (C) a metal aliphatic sulfonate; and (D) a fluorinated olefin resin.

As used herein to represent a specific numerical range, the expression "a to b" means "≥a and ≤b".

(A) Polycarbonate Resin

The polycarbonate resin according to one embodiment of the present invention may include any typical thermoplastic polycarbonate resin without limitation. For example, the polycarbonate resin may be an aromatic polycarbonate resin prepared by reacting one or more diphenols (aromatic dihydroxy compounds) with a carbonate precursor, such as phosgene, halogen formate, or carbonic diester.

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and mixtures thereof, without being limited thereto. For example, the diphenols may include 2,2-bis-(4-hydroxyphenyl)propane, 2,2-bis(3,5-dichloro-4-hydroxyphenyl)propane, and 1,1-bis(4-hydroxyphenyl)cyclohexane, specifically 2,2-bis(4-hydroxyphenyl)propane, which is also referred to as bisphenol A.

Examples of the carbonate precursor may include dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, carbonyl chloride (phosgene), diphosgene, triphosgene, carbonyl bromide, and bishaloformate. These may be used alone or as a mixture thereof.

The polycarbonate resin may be a branched polycarbonate resin. For example, the polycarbonate resin may be prepared by adding about 0.05 mol % to about 2 mol % of a tri- or higher polyfunctional compound, for example, a tri- or higher valent phenol group-containing compound, based on the total number of moles of the diphenols used in polymerization. The polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

In some embodiments, the polycarbonate resin may be a branched polycarbonate resin having a weight average molecular weight (Mw) of about 10,000 g/mol to about 200,000 g/mol, for example, about 15,000 g/mol to about 80,000 g/mol, as measured by gel permeation chromatography with multi-angle light scattering detection (GPC-MALS), and an "a" value (Mark-Houwink constant) of about 0.4 to about 0.7, for example, about 0.5 to about 0.6. Within this range, the thermoplastic resin composition can have good properties in terms of flame retardancy and transparency.

(B) Modified Aromatic Vinyl Copolymer Resin

The modified aromatic vinyl copolymer resin according to the present invention serves to reduce degradation of the polycarbonate resin even under high-temperature and high-humidity conditions and to improve flame retardancy of the thermoplastic resin composition, and is a polymer of a monomer mixture including an aromatic vinyl monomer and glycidyl (meth)acrylate.

Unless otherwise stated, the term "(meth)acryl" as used herein may refer to both "acryl" and "methacryl". For example, "(meth)acrylate" may refer to both "acrylate" and "methacrylate".

In some embodiments, the modified aromatic vinyl copolymer resin may be prepared by any typical polymerization method known in the field of polymer production, for example, mass polymerization, emulsion polymerization, or suspension polymerization. For example, the modified aromatic vinyl copolymer resin may be prepared by adding a polymerization initiator to the monomer mixture, followed by polymerization.

In some embodiments, the polymerization initiator may be a radical polymerization initiator and the polymerization may be suspension polymerization in consideration of index of refraction and the like, wherein the suspension polymerization may be carried out in the presence of a suspension stabilizer and a chain transfer agent. That is, a copolymer resin may be prepared (suspension-polymerized) by adding the radical polymerization initiator and the chain transfer agent to the monomer mixture to prepare a reaction mixture and placing the prepared reaction mixture in an aqueous solution of the suspension stabilizer. In the polymerization process, polymerization temperature and polymerization time may be appropriately adjusted. The polymerization temperature may range from about 65° C. to about 125° C., for example, about 70° C. to about 120° C., and the polymerization time may range from 2 hours to 8 hours. After completion of the polymerization process, the copolymer resin may be subjected to cooling, washing, dehydration, and drying, thereby obtaining a final modified aromatic vinyl copolymer resin.

Examples of the aromatic vinyl monomer may include styrene, α-methyl styrene, β-methylstyrene, p-methyl styrene, p-t-butylstyrene, ethyl styrene, vinylxylene, monochlorostyrene, dichlorostyrene, dibromostyrene, and vinyl naphthalene. These may be used alone or as a mixture thereof.

In some embodiments, the aromatic vinyl monomer may be present in an amount of about 60 wt % to about 90 wt %, for example, about 70 wt % to about 85 wt %, based on the total weight of the monomer mixture, and the glycidyl (meth)acrylate may be present in an amount of about 10 wt % to about 40 wt %, for example, about 15 wt % to about 30 wt %, based on the total weight of the monomer mixture. Within this range, the thermoplastic resin composition can have good flame retardancy.

In some embodiments, the modified aromatic vinyl copolymer resin may have a weight average molecular weight (Mw) of about 20,000 g/mol to about 40,000 g/mol, for example, about 25,000 g/mol to about 35,000 g/mol, as measured by gel permeation chromatography (GPC). Within this range, the modified aromatic vinyl copolymer resin can improve flame retardancy of the thermoplastic resin composition and reduce degradation of the polycarbonate resin even under high-temperature and high-humidity conditions.

In some embodiments, the modified aromatic vinyl copolymer resin may be present in an amount of about 0.01 parts by weight to about 2 parts by weight, for example about 0.1 parts by weight to about 1 part by weight, relative to 100 parts by weight of the polycarbonate resin. If the amount of the modified aromatic vinyl copolymer resin is less than about 0.01 parts by weight relative to 100 parts by weight of the polycarbonate resin, the thermoplastic resin composition can have poor flame retardancy and poor anti-dripping properties, whereas, if the amount of the modified aromatic vinyl copolymer resin exceeds about 2 parts by weight relative to 100 parts by weight of the polycarbonate resin, the thermoplastic resin composition can have poor transparency.

(C) Metal Aliphatic Sulfonate

The metal aliphatic sulfonate according to one embodiment of the present invention serves to reduce degradation of the polycarbonate resin during processing and to improve flame retardancy, thermal stability, and rigidity of the thermoplastic resin composition, and may be represented by Formula 1:

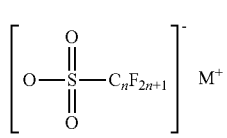

[Formula 1]

where M is lithium (Li), sodium (Na), or potassium (K) and n is an integer of 1 to 10.

Examples of the metal aliphatic sulfonate may include a metal salt of perfluoromethane sulfonic acid, a metal salt of perfluoroethane sulfonic acid, a metal salt of perfluoro propanesulfonic acid, a metal salt of perfluoro butanesulfonic acid, a metal salt of perfluoro pentanesulfonic acid, a metal salt of perfluoro hexanesulfonic acid, a metal salt of perfluoro heptanesulfonic acid, and a metal salt of perfluoro octanesulfonic acid. These may be used alone or in combination thereof. Examples of suitable metals for use in the metal salts of the perfluoroalkane sulfonic acids may include group I metals (alkali metals), such as sodium or potassium, group II metals (alkaline earth metals), copper, and aluminum. Particularly, alkali metals are preferred. Preferably, the metal aliphatic sulfonate is potassium perfluorobutane sulfonate or potassium perfluoropentane sulfonate.

In some embodiments, the metal aliphatic sulfonate may have an average particle diameter of about 100 μm to about 400 μm, for example, about 150 μm to about 350 μm. Within this range, the thermoplastic resin composition can have good properties in terms of flame retardancy, thermal stability, and rigidity and it is possible to reduce increase in surface roughness of a molded article formed of the thermoplastic resin composition due to agglomeration of metal aliphatic sulfonate particles.

In some embodiments, the metal aliphatic sulfonate may be present in an amount of about 0.01 parts by weight to about 1 part by weight, for example, about 0.05 parts by weight to about 0.5 parts by weight, relative to about 100 parts by weight of the polycarbonate resin. If the amount of the metal aliphatic sulfonate is less than about 0.01 parts by weight relative to about 100 parts by weight of the polycarbonate resin, the thermoplastic resin composition can have poor flame retardancy, whereas, if the amount of the metal aliphatic sulfonate exceeds about 1 part by weight relative to about 100 parts by weight of the polycarbonate resin, the thermoplastic resin composition can have low transparency and degradation of the polycarbonate resin can be caused.

In some embodiments, the modified aromatic vinyl copolymer resin (B) and the metal aliphatic sulfonate (C) may be present in a weight ratio (B:C) of about 1:1 to about 3:1. Within this range, the thermoplastic resin composition can have further improved properties in terms of flame retardancy and transparency.

(D) Fluorinated Olefin Resin

The fluorinated olefin resin according to one embodiment of the present invention serves to form a fibrillar network in the thermoplastic resin composition during extrusion of the resin composition and to prevent dripping of the resin composition when the resin composition is burnt by reducing melt viscosity of the resin composition and increasing the shrinkage rate of the resin composition, and examples thereof may include polytetrafluoroethylene, polyvinylidene fluoride, tetrafluoroethylene/vinylidene fluoride copolymer, tetrafluoroethylene/hexafluoropropylene copolymer, ethylene/tetrafluoroethylene copolymer, and combinations thereof, without being limited thereto. For example, the fluorinated olefin resin may be polytetrafluoroethylene (trade name: Teflon).

In some embodiments, the fluorinated olefin resin may be prepared by any suitable polymerization method known in the art. For example, the fluorinated olefin resin may be prepared in an aqueous medium containing a free radical forming catalyst, such as sodium peroxydisulfate, potassium peroxydisulfate, or ammonium peroxydisulfate.

In some embodiments, the fluorinated olefin resin may be an emulsive fluorinated olefin resin or a powdery fluorinated olefin resin. Since the emulsive fluorinated olefin resin requires a complicated manufacturing process despite having good dispersibility, it is desirable to use the powdery fluorinated olefin resin so long as the powdery fluorinated olefin resin can be properly dispersed throughout the resin composition.

In some embodiments, the fluorinated olefin resin may be present in an amount of about 0.01 parts by weight to about 2 parts by weight, for example, about 0.1 parts by weight to about 1 part by weight, specifically about 0.1 parts by weight to about 0.6 parts by weight, relative to about 100 parts by weight of the polycarbonate resin. If the amount of the fluorinated olefin resin is less than about 0.01 parts by weight relative to about 100 parts by weight of the polycarbonate resin, the thermoplastic resin composition can have poor flame retardancy and poor anti-dripping properties, whereas, if the amount of the fluorinated olefin resin exceeds about 2 parts by weight, the thermoplastic resin composition can have low transparency.

In some embodiments, the metal aliphatic sulfonate (C) and the fluorinated olefin resin (D) may be present in a weight ratio (C:D) of about 1:2 to about 1:4. Within this range, the thermoplastic resin composition can have further improved properties in terms of transparency and flame retardancy.

The thermoplastic resin composition according to one embodiment of the present invention may further include typical additives known in the art, as needed. Examples of the additives may include fillers, antioxidants, lubricants, release agents, nucleating agents, antistatic agents, stabilizers, pigments, dyes, and combinations thereof, without being limited thereto. When used in the thermoplastic resin composition, the additives may be present in an amount of about 0.01 parts by weight to about 20 parts by weight relative to about 100 parts by weight of the polycarbonate resin, without being limited thereto.

The thermoplastic resin composition according to one embodiment of the present invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a flame retardancy of V-0 or higher, as measured on a 1.0 mm thick specimen in accordance with a UL-94 vertical burning test.

In some embodiments, the thermoplastic resin composition may have a transmittance of about 80% or more, for example, about 80.5% to about 95%, as measured on a 1.0 mm thick specimen in accordance with ASTM D1003.

A molded product according to the present invention is formed of the thermoplastic resin composition set forth above. The thermoplastic resin composition may be prepared in pellet form. The prepared pellets may be produced into various molded products (articles) by various molding methods, such as injection molding, extrusion, vacuum molding, and casting. These molding methods are well known to those skilled in the art. The molded product has good properties in terms of flame retardancy, transparency, and balance therebetween, and thus is useful as an interior/exterior material for electric/electronic products, an interior/exterior material for automobiles, and an exterior material for buildings.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Polycarbonate Resin

A bisphenol A-type polycarbonate resin (weight average molecular weight: 30,000 g/mol, "a" value: 0.57) was used.

(B) Modified Aromatic Vinyl Copolymer Resin (B1) A copolymer of 80 wt % of styrene and 20 wt % of glycidyl methacrylate (manufacturer: Synergy Materials Supply Pte. Ltd., product name: Addico 9302, weight average molecular weight: 32,000 g/mol) was used.

(B2) A copolymer of 76 wt % of styrene and 24 wt % of acrylonitrile (manufacturer: Lotte Advanced Materials Co., Ltd., product name: HF-5661, weight average molecular weight: 163,000 g/mol) was used.

(C) Metal Aliphatic Sulfonate (C1) KFBS (potassium perfluorobutane sulfonate, manufacturer: 3M Company) was used.

(C2) Potassium diphenyl sulfone-3-sulfonate (manufacturer: SEAL SANDS CHEMICALS, product name: KSS) was used.

(D) Fluorinated Olefin Resin

Polytetrafluoroethylene (manufacturer: MRC Co., Ltd., product name: A-3750) was used.

Examples 1 to 4 and Comparative Examples 1 to 7

The aforementioned components were placed in amounts as listed in Table 1 in a tumbler mixer and mixed for 10 minutes. Then, the mixture was placed in a twin-screw extruder (L/D=44, diameter: 45 mm) and subjected to melt-extrusion at a temperature of 240° C. to 300° C. and a stirring rate of 250 rpm, thereby preparing a thermoplastic resin composition in chip form. The prepared chips were dried at 100° C. for 5 hours or more and subjected to injection molding in a screw-type injection machine (manufacturer: LG Cable & System, product name: LGH-140N) at a temperature of 240° C. to 300° C., thereby preparing a specimen. The prepared specimen was evaluated as to the following properties. Results are shown in Table 1.

Property Evaluation (1) Flame retardancy: Flame retardancy was measured on a 1.0 mm thick specimen in accordance with a UL94 vertical burning test.

(2) Transmittance (unit: %): Transmittance was measured on a 1.0 mm thick specimen using a colorimeter (Minolta 3600D by CIE Lab.) in accordance with ASTM D1003.

TABLE 1

|  | Example | | | | Comparative Example | | | | | | |
| --- | --- | --- | --- | --- | --- | --- | --- | --- | --- | --- | --- |
|  | 1 | 2 | 3 | 4 | 1 | 2 | 3 | 4 | 5 | 6 | 7 |
| (A) (parts by weight) | 100 | 100 | 100 | 100 | 100 | 100 | 100 | 100 | 100 | 100 | 100 |
| (B1) (parts by weight) | 0.1 | 0.2 | 0.2 | 0.4 | — | 0.2 | — | 0.2 | 3 | 0.2 | 0.2 |
| (B2) (parts by weight) | — | — | — | — | 0.2 | — | — | — | — | — | — |
| (C1) (parts by weight) | 0.1 | 0.15 | 0.15 | 0.15 | 0.15 | — | 0.15 | — | 0.15 | 1.5 | 0.15 |
| (C2) (parts by weight) | — | — | — | — | — | 0.15 | — | — | — | — | — |
| (D) (parts by weight) | 0.3 | 0.3 | 0.5 | 0.5 | 0.3 | 0.3 | 0.5 | 0.3 | 0.3 | 0.3 | 2.1 |
| Flame retardancy (1.0 mm) | V-0 | V-0 | V-0 | V-0 | V-1 | V-2 | V-0 | V-2 | V-2 | V-1 | V-0 |
| Transmittance (%) | 83.2 | 82.9 | 81.2 | 80.7 | 84.0 | 83.5 | 69.5 | 84.2 | 81.9 | 50.7 | 69.5 |

From the results shown in Table 1, it can be seen that the thermoplastic resin composition had good properties in terms of flame retardancy and transparency.

Conversely, the thermoplastic resin composition of Comparative Example 1, using the SAN resin (B2) instead of the modified aromatic vinyl resin (B1) according to the present invention, had poor flame retardancy, and the thermoplastic resin composition of Comparative Example 2, using the metal aromatic sulfonate (C2) instead of the metal aliphatic sulfonate (C1) according to the present invention, had poor flame retardancy. In addition, the thermoplastic resin composition of Comparative Example 3, free from the modified aromatic vinyl resin, had very poor transparency, and the thermoplastic resin composition of Comparative Example 4, free from the metal aliphatic sulfonate, had very poor flame retardancy. Further, the thermoplastic resin composition of Comparative Example 5, in which the modified aromatic vinyl resin was used in an amount exceeding the range according to the present invention, had very poor flame retardancy, the thermoplastic resin composition of Comparative Example 6, in which the metal aliphatic sulfonate was used in an amount exceeding the range according to the present invention, had poor flame retardancy and low transparency, and the thermoplastic resin composition of Comparative Example 7, in which the fluorinated olefin resin was used in an amount exceeding the range according to the present invention, had very poor transparency.

It should be understood that various modifications, changes, alterations, and equivalent embodiments can be made by those skilled in the art without departing from the spirit and scope of the invention.

The invention claimed is:

1. A thermoplastic resin composition comprising:
   about 100 parts by weight of a polycarbonate resin;
   about 0.01 parts by weight to about 2 parts by weight of a modified aromatic vinyl copolymer resin;

about 0.01 parts by weight to about 1 part by weight of a metal aliphatic sulfonate; and about 0.01 parts by weight to about 2 parts by weight of a fluorinated olefin resin, wherein the modified aromatic vinyl copolymer resin is a polymer of a monomer mixture comprising an aromatic vinyl monomer and glycidyl (meth)acrylate, wherein the metal aliphatic sulfonate and the fluorinated olefin resin are present in a weight ratio of about 1:2 to about 1:4, and wherein the thermoplastic resin composition has a flame retardancy of V-0 or higher, as measured on a 1.0 mm thick specimen in accordance with a UL-94 vertical burning test and a transmittance of about 80% or more, as measured on a 1.0 mm thick specimen in accordance with ASTM D1003.

2. The thermoplastic resin composition according to claim 1, wherein the polycarbonate resin has a weight average molecular weight (Mw) of about 10,000 g/mol to about 200,000 g/mol.

3. The thermoplastic resin composition according to claim 1, wherein the polycarbonate resin is a branched polycarbonate resin.

4. The thermoplastic resin composition according to claim 1, wherein the modified aromatic vinyl copolymer resin is a polymer of the monomer mixture comprising about 60 wt % to about 90 wt % of the aromatic vinyl monomer and about 10 wt % to about 40 wt % of the glycidyl (meth)acrylate.

5. The thermoplastic resin composition according to claim 1, wherein the modified aromatic vinyl copolymer resin has a weight average molecular weight (Mw) of about 20,000 g/mol to about 40,000 g/mol.

6. The thermoplastic resin composition according to claim 1, wherein the metal aliphatic sulfonate is represented by Formula 1:

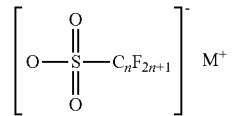

where M is lithium (Li), sodium (Na), or potassium (K), and n is an integer of 1 to 10.

7. The thermoplastic resin composition according to claim 1, wherein the modified aromatic vinyl copolymer resin and the metal aliphatic sulfonate are present in a weight ratio of about 1:1 to about 3:1.

8. A molded product formed of the thermoplastic resin composition according to claim 1.

* * * * *